Patented Feb. 14, 1933

1,897,430

UNITED STATES PATENT OFFICE

ERNST HONOLD, OF FRANKFORT-ON-THE-MAIN-FECHENHEIM, GERMANY, ASSIGNOR TO GENERAL ANILINE WORKS, INC., OF NEW YORK, N. Y., A CORPORATION OF DELAWARE

NEW VAT DYESTUFF OF THE ANTHRAQUINONE SERIES

No Drawing. Application filed January 11, 1932, Serial No. 586,082, and in Germany January 13, 1931.

This invention relates to new vat dyestuffs of the anthraquinone series.

U. S. Application Serial No. 530,146, filed April 14, 1931, describes vat dyestuffs which are obtainable by causing condensation of two molecular proportions of α-amino-anthraquinone or an aroylamino- or alkoxy substitution product thereof with one molecular proportion of a reactive derivative of a dicarboxylic acid of an aromatic polycyclic hydrocarbon, more particularly of a dihalide or diester of a naphthalene dicarboxylic acid, diphenyl-para-para'-dicarboxylic acid or diphenylmethane dicarboxylic acid which compounds may be substituted by halogen atoms, alkyl- or alkoxy groups, such dicarboxylic acids being excepted as are capable of forming internal anhydrides.

In accordance with the present invention dyestuffs possessing similar good fastness properties are obtained by employing instead of the dicarboxylic acid derivatives mentioned in the above application, reactive derivatives of diphenyl dicarboxylic acids in which the o—o'-positions to the diphenyl linkage are joined by one or two carbon atoms to form a carbocyclic ring or by a bridge of other atoms to form a heterocyclic ring, for example by oxygen or one or two nitrogen atoms. Such compounds are, for example, the chlorides or bromides of dicarboxylic acids of fluorene, fluorenone, diphenyloxide, carbazole and its nitrogenous alkyl derivatives, phenazone.

The new dyestuffs probably correspond to the formula

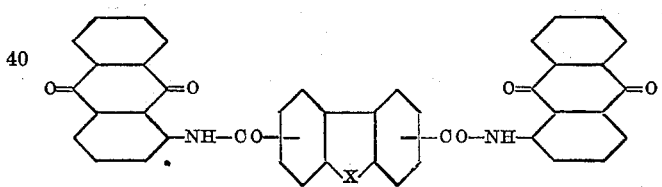

wherein X means $CH_2$, CO, O, NH, N-alkyl or $N=N$ and wherein the anthraquinone nuclei may be substituted by aroylamino- or alkoxy groups, preferably benzoylamino- or methoxy groups.

They form yellow to red powders, difficultly soluble in the usual organic solvents, dissolving in strong sulfuric acid with a yellow coloration, dyeing cotton from a brown to blue alkaline hydrosulfite vat strong yellow to bluish-red shades of good fastness properties.

The following examples illustrate the invention without, however, restricting it thereto:—

Example 1

12 parts by weight of diphenylene-2:2'-oxide-4.4'-dicarboxylic acid dichloride (prepared by heating 4.4'-di-(chloraceto) diphenylene-oxide with an alkaline hypochlorite solution of 10–15° Bé. on the water bath, isolating the reaction product by salting out and converting the dicarboxylic acid thus formed into the corresponding dichloride by means of phosphorous pentachloride) are added to a solution heated to 60° C. of 20 parts by weight of 1-amino-anthraquinone in 200 parts by weight of nitrobenzene. While stirring continually the temperature is slowly raised to 200° C. when the new dyestuff separates in crystals. As soon as the evolution of hydrochloric acid ceases the melt is filtered and the residue is washed with benzene. For further purification the dyestuff is dissolved in dilute sulfuric acid. It corresponds probably to the formula:

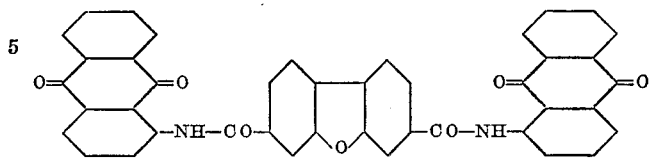

With hydrosulfite and caustic soda lye it forms a dark red vat dyeing cotton very fast greenish yellow shades.

The product obtained in a similar manner to that described above from 15 parts by weight of diphenylene-2:2'-oxide-4:4'-dicarboxylic acid dichloride and 35 parts by weight of 1-amino-5-benzoylamino-anthraquinone forms a dark brown vat dyeing cotton fast yellow shades. On starting with 1-amino-4-benzoyl-amino-anthraquinone a product results dyeing cotton red shades and by starting with 1-amino-4-methoxy-anthraquinone a vat dyestuff dyeing orange shades is obtained.

*Example 2*

30 parts by weight of phenazone-dicarboxylic acid dichloride M. P. 208° C. (prepared by nitrating diphenyl-4.4'-dicarboxylic acid reducing (for example, with zinc and ammonia) the 2.2'-dinitro-diphenyl-4.4'-dicarboxylic acid thus formed and converting the resulting dicarboxylic acid into the corresponding dichloride by means of phosphorous pentachloride), are added to a solution heated to 80–100° C. of 45 parts by weight of α-amino-anthraquinone in 400 parts by weight of nitrobenzene. The mixture is stirred for half an hour at 180° C. and after cooling to 80° C. the dyestuff is filtered off with suction and washed. It corresponds probably to the formula:

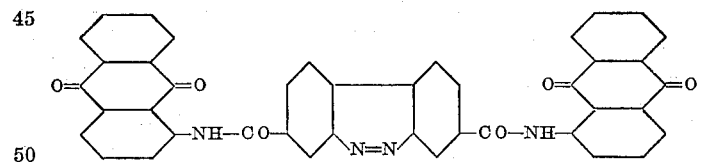

It is soluble in concentrated sulfuric acid with a yellow coloration and forms a red alkaline hydrosulfite vat from which cotton is dyed a fast greenish yellow.

The product obtained with the same dicarboxylic acid dichloride and 1-amino-5-benzoylamino-anthraquinone dyes cotton from a bluish green hydrosulfite vat fast orange yellow shades.

*Example 3*

The dyestuff obtainable in a similar manner as described in the foregoing example from ethyl-carbazole-dicarboxylic acid dichloride and 1-amino-anthraquinone forms a brown vat dyeing cotton reddish-yellow fast shades. By condensing the same dicarboxylic acid dichloride with 1-amino-5-benzoylamino-anthraquinone an orange vat dyestuff results.

Ethyl-carbazole-dicarboxylic acid dichloride is prepared by treating ethyl-carbazole with acetyl chloride, oxidizing the diacetyl compound thus obtained and converting the ethyl-carbazole-dicarboxylic acid into the corresponding dichloride by means of phosphorous pentachloride.

A similar dyestuff is obtained by replacing in this example ethyl-carbazole-dicarboxylic acid chloride by the corresponding amount of carbazole-dicarboxylic acid chloride.

*Example 4*

30 parts by weight of fluorenone-dicarboxylic acid dichloride (obtainable by condensation of fluorene with acetylchloride, oxidation of the diacetyl compound and conversion of the dicarboxylic acid into the corresponding dichloride) are condensed with 45 parts by weight of 1-amino-anthraquinone with the addition of nitrobenzene at a temperature of 180–200° C. The dyestuff formed dyes cotton from a dark red vat in greenish yellow shades which possess valuable properties. It corresponds probably to the formula:

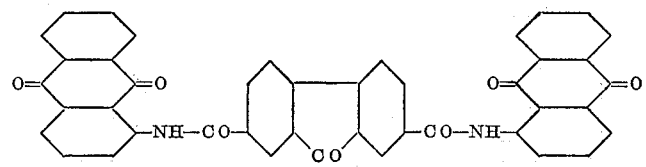

The color of the solution in concentrated sulfuric acid is red.

On substituting the 1-amino-anthraquinone by the corresponding quantity of 1-amino-5-benzoyl-amino-anthraquinone a dyestuff is obtained which dyes cotton from a bluish-green vat in very fast orange yellow shades. The dyestuff is soluble in concentrated sulfuric acid with a red coloration.

When in the preparation of the starting material the diacetyl-fluorene is oxidized at relatively moderate conditions, instead of the fluorenone-dicarboxylic acid the fluorene-dicarboxylic acid is obtained which yields when converted into the acid halide and condensed with 1-amino-anthraquinone an analogous dyestuff.

I claim:

1. The new vat dyestuffs of the probable general formula:

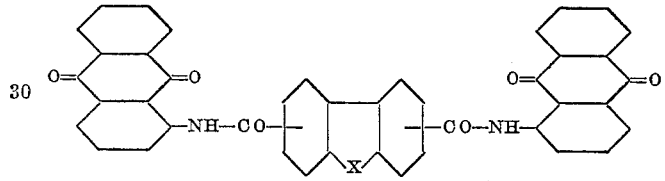

wherein X means $CH_2$, CO, O, NH, N-alkyl or $N=N$ and wherein the anthraquinone nuclei may be substituted by aroylamino- or alkoxy groups, said dyestuffs forming yellow to red powders, nearly insoluble in the usual organic solvents, soluble in strong sulfuric acid with a yellow coloration, dyeing cotton from a brown to blue alkaline hydrosulfite vat yellow to bluish-red shades of good fastness properties.

2. The new vat dyestuff of the probable formula:

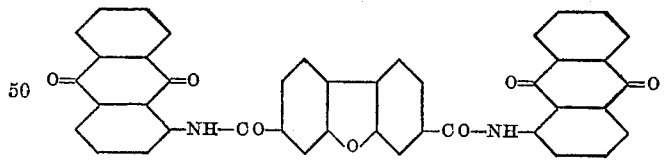

said dyestuff dyeing cotton from a dark red vat greenish-yellow shades of a good fastness.

3. The new vat dyestuff of the probable formula:

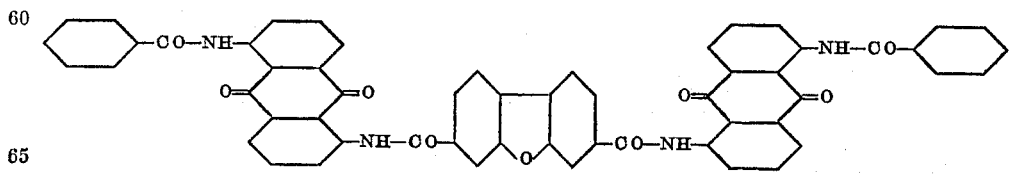

said dyestuff dyeing cotton from a dark brown vat fast yellow shades.

4. The new vat dyestuff of the probable formula:

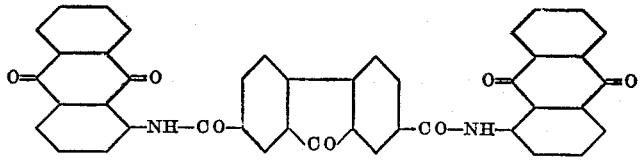

said dyestuff dyeing cotton from a dark red vat greenish yellow shades of a good fastness.

In testimony whereof, I affix my signature.

ERNST HONOLD.